(12) United States Patent
So

(10) Patent No.: US 7,614,396 B2
(45) Date of Patent: Nov. 10, 2009

(54) SELF-CLEANING EXHAUST SYSTEM AND METHOD

(76) Inventor: Kim Lui So, Block 3, Normanton, 16-173 (SG) 119000

( * ) Notice: Subject to any disclaimer, the term of this patent is extended or adjusted under 35 U.S.C. 154(b) by 267 days.

(21) Appl. No.: 10/524,309

(22) PCT Filed: Aug. 8, 2003

(86) PCT No.: PCT/SG03/00190

§ 371 (c)(1),
(2), (4) Date: Feb. 7, 2005

(87) PCT Pub. No.: WO2004/016988

PCT Pub. Date: Feb. 26, 2004

(65) Prior Publication Data

US 2005/0247244 A1  Nov. 10, 2005

(30) Foreign Application Priority Data

Aug. 16, 2002  (SG) .............................. 200204963-3

(51) Int. Cl.
*F24C 15/32* (2006.01)
(52) U.S. Cl. .............................. 126/299 E; 126/299 R; 55/DIG. 36
(58) Field of Classification Search ............. 126/299 R, 126/299 E; 95/214; 55/DIG. 36
See application file for complete search history.

(56) References Cited

U.S. PATENT DOCUMENTS

| | | | | |
|---|---|---|---|---|
| 3,260,189 A | * | 7/1966 | Jensen | 126/299 D |
| 3,616,744 A | * | 11/1971 | Jensen | 126/299 E |
| 3,659,402 A | * | 5/1972 | Alliger | 96/297 |
| 3,805,685 A | * | 4/1974 | Carns | 126/299 E |
| 3,885,929 A | * | 5/1975 | Lyon et al. | 95/214 |
| 4,157,250 A | * | 6/1979 | Regehr et al. | 96/299 |
| 4,192,746 A | * | 3/1980 | Arvanitakis | 210/804 |
| 4,351,652 A | * | 9/1982 | Wisting | 126/299 E |
| 4,753,218 A | * | 6/1988 | Potter | 126/299 E |
| 5,042,456 A | * | 8/1991 | Cote | 126/299 D |
| 5,359,990 A | * | 11/1994 | Hsu | 126/299 E |
| 5,472,342 A | | 12/1995 | Welsh, II et al. | |
| 6,293,983 B1 | * | 9/2001 | More | 55/486 |
| 6,895,954 B2 | * | 5/2005 | Swierczyna et al. | 126/299 E |
| 7,028,688 B1 | * | 4/2006 | Grove et al. | 128/201.25 |
| 2002/0011150 A1 | * | 1/2002 | Wakamatsu et al. | 95/214 |

FOREIGN PATENT DOCUMENTS

| | | | |
|---|---|---|---|
| CH | 683597 | * | 4/1994 |
| DE | 195 09 611 A1 | | 3/1995 |
| EP | 0 029 807 | | 11/1980 |
| EP | 0 029 807 | * | 6/1981 |
| GB | 2 139 750 A | | 11/1984 |
| GB | 2139750 | * | 11/1984 |
| WO | WO 93/18348 | | 9/1993 |

* cited by examiner

*Primary Examiner*—Carl D Price
(74) *Attorney, Agent, or Firm*—Browning Bushman, P.C.

(57) ABSTRACT

A self-cleaning exhaust system including a top, a front wall, a rear wall, and side walls extending between the rear wall and the front wall. A baffle depending from the top intermediate the front wall and the rear wall. A plate extending forwardly from the rear wall to forwardly of the baffle. A first filter is located in an air flow path. A first spray outlet is located in the air flow path before the first filter for providing a first cleaning spray into the air flow so that the air flow draws the cleaning spray onto a first surface of the first filter. A method of removing contaminants is also disclosed.

33 Claims, 5 Drawing Sheets

SELF-CLEANING EXHAUST SYSTEM AND METHOD

FIELD OF THE INVENTION

Figure 1:
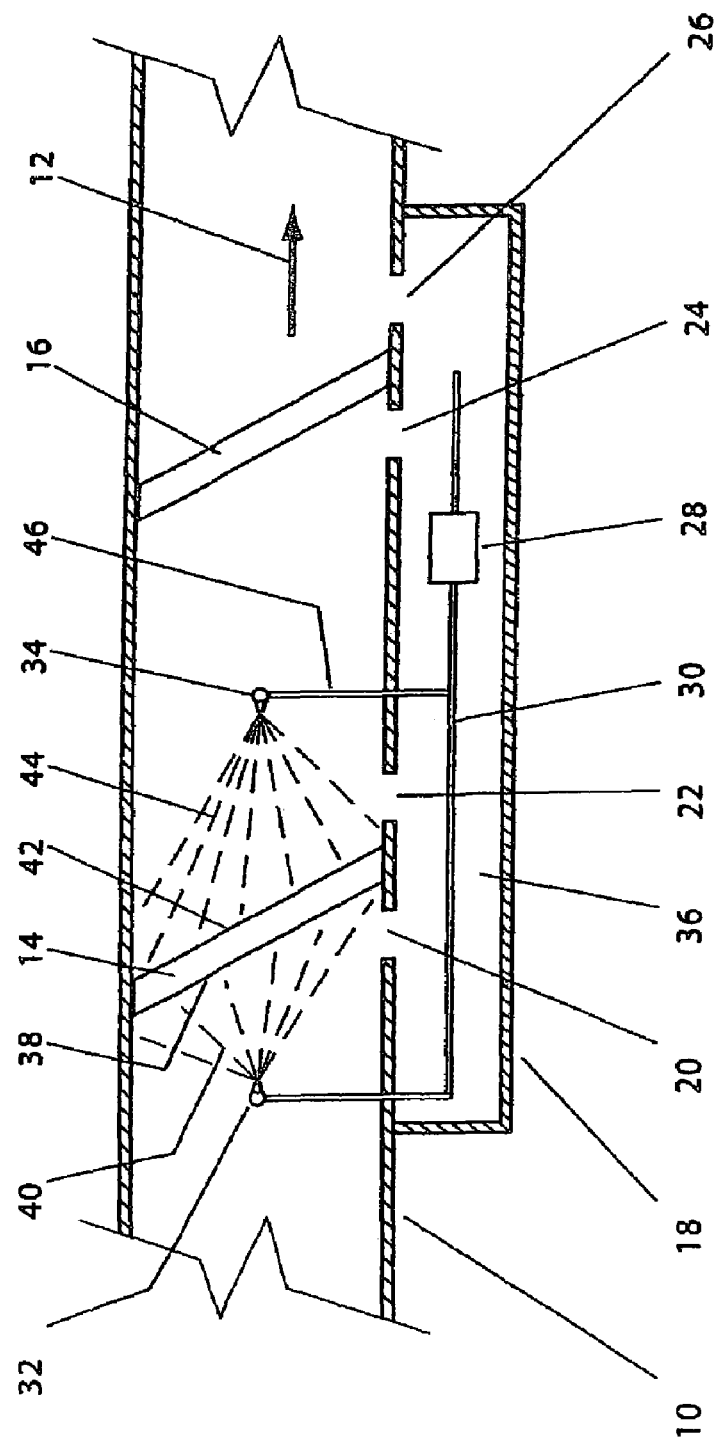

The present invention relates to a self-cleaning exhaust system and method and refers particularly, though not exclusively, to a self-cleaning exhaust system and method for use in locations where an exhaust system is used to exhaust vapours such as, for example, domestic, industrial and commercial processes including cooking in kitchens. The present invention may also be used in oil recovery.

BACKGROUND TO THE INVENTION

Exhaust systems including exhaust hoods are used in many industries to remove polluted air from a work area. This may include the manufacturing and chemical industries. In particular, they are used in kitchens such as industrial and commercial kitchens in the food processing industry, and restaurants of all types and categories. In commercial kitchens food is quite often cooked in oil, or by using oil as a lubricant. The cooking fumes contain oil droplets. Filters include a stainless steel mesh to capture the majority of oil droplets and may be located in the exhaust hood, the flue of the exhaust hood, or in the ducting. Droplets not captured by the filter land on the surface of the exhaust hood, the flue, the ducting, or are exhausted to atmosphere. When the oil droplets cool and start to dry they become very sticky, and are hard to remove. Also, such filters have a fairly open mesh as if a fine mesh is used they can become clogged (and thus become ineffective) very quickly. The exhaust hood can also be quickly lined with the cooled and dried oil, as can the flue and the ducting. This leads to many problems: a rapid build-up of bacteria in the cooled and dried oil—a major problem in a commercial kitchen; and increased fire risk from the oil; ineffective exhaust operation leading to greater workplace health and safety issues; and increased pollution of the atmosphere.

Cleaning exhaust hoods and the filters manually is time-consuming, tedious, and labour intensive task. Also, some of the flue and/or ducting may be inaccessible for cleaning.

There have been many proposals for self-cleaning using water curtains, water baths, or sprays. Most have the problem that they cannot be operated during cooking process—when the oil is most fluid and therefore more easily removed. Most do not improve the elimination of oil from the exhaust air to atmosphere.

SUMMARY OF THE INVENTION

In accordance with a preferred aspect of the present invention, there is provided a self-cleaning exhaust system including a first filter in a path for an air flow. A first spray outlet is located in the path before the first filter for providing a first cleaning spray into the air flow to enable the first cleaning spray to be drawn onto a first surface of the first filter by the air flow. There may be a second spray means located in the path after the first filter for providing a second cleaning spray onto a second surface of the first filter. There may be provided a second filter in the path after said first filter. The second filter may be substantially identical to the first filter.

The first cleaning spray is preferably a mist spray to enable water droplets to combine with droplets of a contaminant in the air flow before the contaminant droplets contact the first surface of the first filter. The second cleaning spray is preferably a coarse spray.

The first spray outlet may be at least one nozzle, and the second spray outlet may be at least one nozzle.

The self-cleaning exhaust system may have an exhaust hood with a top, a front wall, a rear wall, and sidewalls extending between the rear wall and the front wall. There may also be a baffle depending from the top intermediate the front wall and the rear wall. Both the first and second filters may be mountable to the baffle and to either the front wall or the rear wall. There may also be a plate extending forwardly from the rear wall forwardly of the baffle, or from the front wall rearwardly of the baffle.

The plate may have an upwardly directed projection extending between the baffle and the front or rear wall. The projection may extend upwardly to a height at least as high as the mounting of the first filter to the baffle.

The first spray outlet may be mounted on the plate, and the second spray outlet may be mounted on the rear wall.

The first filter may be inclined with respect to the air flow path, and cover the air flow path. The second filter may also be inclined with respect to the air flow path, and cover the air flow path. The first filter may be at an angle of inclination to the air flow path substantially the same as that of the second filter.

The self-cleaning exhaust hood may include a tank for containing a cleaning solution for the cleaning sprays. The cleaning solution may include a degreaser. The first cleaning spray may have droplets of a size to combine with droplets of contaminants before the contaminant droplets contact the first filter. This will assist the combined droplets falling from the air flow before contacting the first filter, and to assist the combined droplets being captured by the first filter and draining from the first filter after capture.

An another form, the present invention provides a self-cleaning exhaust hood including a first filter for filtering contaminants from an air flow along an air flow path, a first spray outlet for providing a first spray of a cleaning solution into the air flow to enable the cleaning solution to be drawn onto the first filter, and a plate for preventing the first spray from moving against the air flow.

The plate may be mounted below the first filter and may have an upwards projection at an end of the plate.

In another form there is provided a method of removing at least one contaminant in an exhaust system including providing a first spray into an air flow before a first filter, the first filter being mounted in a path of the air flow to enable the first spray to be drawn along the path onto the first filter, the first spray being able to combine with droplets of the contaminant in the air flow before the first filter.

The first spray may be drawn along the path under the influence of the air flow, and the air flow causes at least a part of the first spray to pass through the first filter.

There may also be provided a second spray into the air flow after the first filter; the second spray may be for cleaning a second filter in said airflow path after said first filter. Alternatively or additionally, the second spray may be for cleaning a rear surface of the first filter, and for being drawn under the influence of the airflow to clean a second filter in said airflow path after said first filter.

The first filter may be a relatively coarse filter, the second filter may be a relatively fine filter, the first spray may be a relatively fine spray and the second spray may be a relatively coarse spray.

The first spray may be from a first spray outlet and the second spray from a second spray outlet. Each of the first spray outlet and the second spray outlet may be at least one nozzle.

Preferably, the first spray substantially coats the first filter to assist the first filter in capturing the at least one contaminant. More preferably, the second spray substantially coats the second filter to assist the second filter in capturing the at least one contaminant.

The first filter and the second filter may be in an exhaust hood. The exhaust hood may include a top, a front wall, a rear wall, and side walls extending between the rear wall and the front wall; there being provided a baffle depending from the top intermediate the front wall and the rear wall. Both the first and second filters may be mountable to one of the front wall and the rear wall and the baffle extends between the baffle and the one of the front wall and the rear wall; there being a plate extending forwardly from the one of the front wall and the rear wall beyond the baffle.

The plate may have an upwardly directed projection extending between the baffle and the one of the front wall and the rear wall; the projection extending upwardly to a height at least as high as the mounting of the first filter to the baffle; the plate preventing the first spray from moving against the air flow out of the exhaust hood.

The first spray outlet may be mounted on the plate and the second spray outlet may be mounted on the one of the front wall and the rear wall.

The first spray may have droplets of a size to combine with droplets of the contaminant to form combined droplets, and to assist the combined droplets being captured by the first filter.

The nature and mesh size of the first and second filters, and of any additives to the sprays, is preferably determined by the nature of the contaminant.

DESCRIPTION OF THE DRAWINGS

In order that the invention can be readily understood and put into practical effect, there shall now be described by way of non-limitative example only a preferred embodiment of the present invention, the description being with reference to the accompanying illustrative drawings in which:

FIG. 1 is a schematic view of the operation of the self-cleaning exhaust system of the present invention;

FIG. 2 is a vertical cross-sectional view of a first preferred form of self-cleaning exhaust hood according to a first embodiment of the present invention;

FIG. 3 is a schematic representation of a preferred form of the tank system;

FIG. 4 is a vertical cross-sectional view of a second preferred form according to a second embodiment of the present invention; and FIG. 5 is a perspective view in partial cutaway of the form of FIG. 2.

DESCRIPTION OF THE PREFERRED EMBODIMENTS

To first refer to FIG. 1, there is shown an airflow path defined by an airflow path 10 through which air flows in the direction of arrow 12.

Mounted in path 10 is a first filter 14 for filtering contaminants, particularly oil droplets, from the air flowing through path 10. The filter should substantially completely block path 10 so only minimal air in airflow 12 does not pass through first filter 14.

Located behind first filter 14 is a second filter 16 preferably substantially the same as first filter 14, so as to allow for interchangeability. Its mesh size may be the same as first filter 14, or may be smaller. As the majority of the oil droplets will be removed by or before first filter 14, second filter 16 may have a smaller mesh size than first filter 14 as the risk of clogging is significantly reduced. Most preferably, first filter 14 has a relatively coarse mesh size, and second filter 16 has a relatively fine mesh size. However, the nature of each filter, and the mesh size of each filter, will be determined by the nature of the contaminant to be removed from the air flow.

A cleaning solution basin or tank 18 may be operatively connected to path 10. The tank 18 may be attached to path 10, as shown, or may be separate from path 10. If separate, appropriate connections such as by hoses, tubes, pipes, manifolds, and so forth will need to be provided. Access openings 20, 22, 24 and 26 are provided from path 10 into tank 18. These may be direct openings, or may represent hoses, tubes, pipes, manifolds, and so forth.

Located in or adjacent tank 18 is a pump 28 for optionally supplying a cleaning solution 26 through pipes, tubes or hoses 30 to a first nozzle 32 mounted in front of first filter 14. Nozzle 32 may be a single nozzle, a plurality of nozzles in an array, an outlet manifold with a plurality of holes (as in a shower rose), or the like. The purpose of nozzle 32 is to provide a fine spray 40 of water (that optionally contains cleaning solution 26) into the airflow 12 in front of front surface 38 of first filter 14 so that the air flow 12 draws the fine spray 40 onto substantially the complete front surface 38 of first filter 14. The nozzle 32 "atomizes" the cleaning solution 36 to form a fine spray 40, preferably a very fine spray 40. The spray 40 should have a droplet size such that it % will be carried by airflow 12 onto surface 38 and into filter 14 to thus clean surface 38 and filter 14. However, the pressure applied by pump 28 is preferably not so great that spray 40 will be reflected by surface 38 with such force that it will be flow against air flow 12 and thus risk passing along air path to the cooking area. By having filters 14, 16 angled, any reflected spray will tend to be directed in a manner as to be captured by airflow 12.

As the airflow 12 is being used to assist the fine spray 40 onto surface 38 of first filter 14, the pressure required for spray 40 is relatively low. This reduces the size and capacity of pump 28, thus saving capital cost, and running cost It also reduces the amount of cleaning solution required.

The cleaning solution may be water or, preferably, the cleaning solution is a mixture of water and a degreaser in a required ratio. The ratio may be any suitable ratio depending on the degreaser used, and the oil used during the cooking process. Preferably the ratio is in the range of 1:10 to 1:50; more preferably 1:20. The cleaning solution used will depend on the nature of the contaminants in the airflow 12. For example, if the contaminants are acidic the cleaning solution may be alkaline to not only capture and clean, but also to neutralize the contaminants. Similarly, for alkaline contaminants, the cleaning solution may be acidic. For gaseous contaminants, the cleaning solution may contain neutralizng solutions and/or gases.

In this way the first filter 14 is cleaned by spray 40. The spray 40 will also combine with the oil droplets in the airflow 12 to form larger droplets. The larger droplets will tend to fall from the airflow 12 before contacting first filter 14 and will drop under the influence of gravity to the bottom of path 10. Also, the larger droplets will more likely be captured by first filter 14. When captured by first filter, as the oil droplets are still fluid as they have not yet cooled, they will be acted on by the degreaser in the cleaning solution 36 of spray 40, and will thus flow down first filter 14 under the influence of gravity to the bottom of path 10, and flow through opening 20 back into tank 18. In this way the cleaning solution 36 can be recycled. The oil droplets in the tank 18 will rise to the top and may be collected for disposal or recycling.

The spray 40 coats all surfaces of the first filter 14 thus enhancing the capturing of contaminants by the first filter 14. By having the spray 40 in front of the first filter 14, the spray 40 is continuously drawn to the first filter 14 under the influence of the air flow 12, and thus continuously coats the surfaces of first filter 14, and will also flush the first filter 14.

Droplets from spray 40, particularly relatively fine droplets, may pass through first filter 14. They would then be carried by airflow 12 to second filter 16 where second filter 16 can be cleaned in the same manner. Also, droplets from spray 40 can similarly combine with droplets of contaminants between first filter 14 and second filter 16.

In this way the majority of contaminants and cleaning spray 40 is captured by filters 14, 16. This prevents the majority of contaminants and the cleaning spray passing along subsequent ducting. With first filter 14 being a multi-layer filter of mesh size 12 mesh (12 holes per square inch); the second filter 16 being of 50 mesh (50 holes per square inch) and a wire size of 0.18 mm, the opening size in second filter 16 will be 0.328 square millimeters; and with spray 40 operating, Ashrae method RP-8561 tests have shown 91.8% efficiency in removing contaminants.

Also, spray 40 will coat first filter 14 so that when droplets of contaminant contact first filter 14, they will combine with the coating of spray 40 and flow down filter 14 under the influence of gravity and be able to be removed.

A second nozzle 34 supplied by pipe or hose 46, may be provided behind first filter 14 to spray cleaning 36 solution on to rear surface 42 of first filter 14. The second nozzle 34 may be the same as first nozzle 32, or maybe different. Preferably, it provides a relatively coarse spray 44 over substantially all of rear surface 42 to further assist in cleaning first filter 14. As the spray 44 is against air flow 12, the pressure from pump 28 will be higher to nozzle 34 than for first nozzle 32. Any spray 44 together with captured oil will drain down filter 14 and surface 42 and pass through opening 22 into tank 18. Any spray 44 reflected off surface 42 will be carried by air flow 12 to second filter 16 thus preventing undesired food contamination. Also, some of spray 44 may be carried by airflow 12 to second filter 16. Furthermore, part of spray 44 may combine with droplets of contaminants between first filter 14 and second filter 16. The combined droplets may fall from airflow 12 before second filter 16, or may flow down second filter 16 under the influence of gravity. Alternatively, the spray 44 may be directed towards second filter 16.

Pump 28 may be in the same circuit as the fan (not shown) for the airflow 12 so no spraying of cleaning solution will take place unless there is airflow 12. In this way the cleaning solution cannot flow to the cooking area. However, pump 28 should be able to be independently switched off, if desired. This may be required to be able to clean the filters when there are no contaminants in the air flow 12—i.e. there is no cooking or other contaminant-originating action taking place. A separate pump may be used for second nozzle 34, if desired, to assist in having the higher pressure at nozzle 34 that at nozzle 32.

By having filters 14, 16 continuously cleaned during the cooking operation, clogging is less likely and thus smaller mesh sizes may be used in filters 14, 16 to thus increase the effectiveness of their operation.

Filters 14, 16 may be mounted with an exhaust hood, in a exhaust flue from an exhaust hood, or in ducting.

Figure 2:
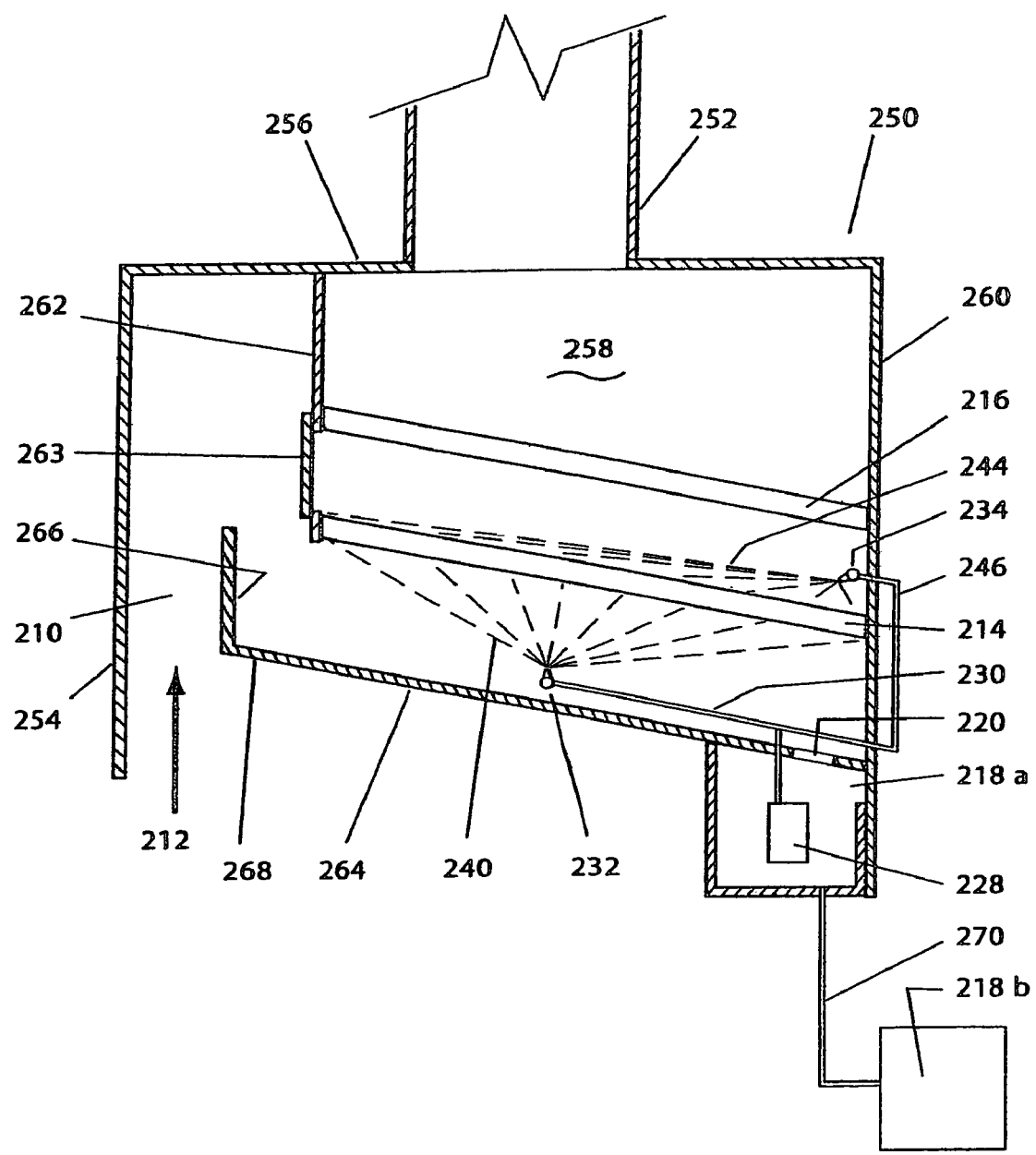

To refer to FIG. 2, like components use like reference numerals with the addition of a prefix number "3". Here, there is shown an exhaust hood 250 with an exhaust flue 252. Hood 250 has a front wall 254, top 256, sides 258 and rear 260. Front wall 254 may be hingedly connected to top 256, if desired. An air flow path 210 is partly defined by front 254, and an internal baffle 262 depending from top 256 for the operative width of hood 250. Removably mounted to baffle 262 and rear 260 are first filter 214 and second filter 216. Mounted below first filter 214 and extending forwardly from rear 260 is a plate 264, again extending for the full operative width of hood 250. Plate 264 forms a further part of air path 210. Plate 264 extends forwardly to a position intermediate the planes of baffle 262 and front wall 254. Baffle 262 may have an access opening 263 to allow easy access to filters 214 and 216 for cleaning and/or replacement of either or both of the filters 214 and 216.

Plate 264 may have an end projection 266 extending upwardly from front end 268 of plate 264. Projection 266 extends for the full operative width of hood 250. Projection 266 preferably extends upwardly to at least where first filter 214 is attached to baffle 262. Projection 266 is also preferably located approximately mid-way between front wall 254 and baffle 262.

Air flow path 210 is therefore somewhat "S" shaped in that it passes between front 254 and projection 266, over projection 266, between projection 266 and baffle 262, between plate 264 and first filter 214, then through first filter 214 and second filter 216.

Mounted on plate 264 is first nozzle(s) 232 for directing a fine spray 240 into air flow path 210 so that air flow 212 draws spray 240 into first filter 214. Second nozzle is mounted on rear wall 260 for directing a second, relatively coarse spray 244 onto first filter 214. In this instance, tank 18 is split between a first tank 218a and a second tank 218b, connected by a pipe 270. Pipes/tubes 230 and 246 operate as normal. A drainage outlet 220 is also provided.

Spray 240 will not "escape" from hood 250 due to plate 264 and projection 266 and/or due to airflow 212. Therefore, the spray system can operate when cooking is taking place beneath plate 264.

To allow for filter 14, 16 to drain, they are preferably mounted such that they are not horizontal. Preferably, they are inclined to the horizontal by an angle of between 10° and 90°, Again, the hood 250 is such that the headroom required is no different to that required for a "standard" exhaust hood. The additional features do not cause an increase in height.

Figure 3:
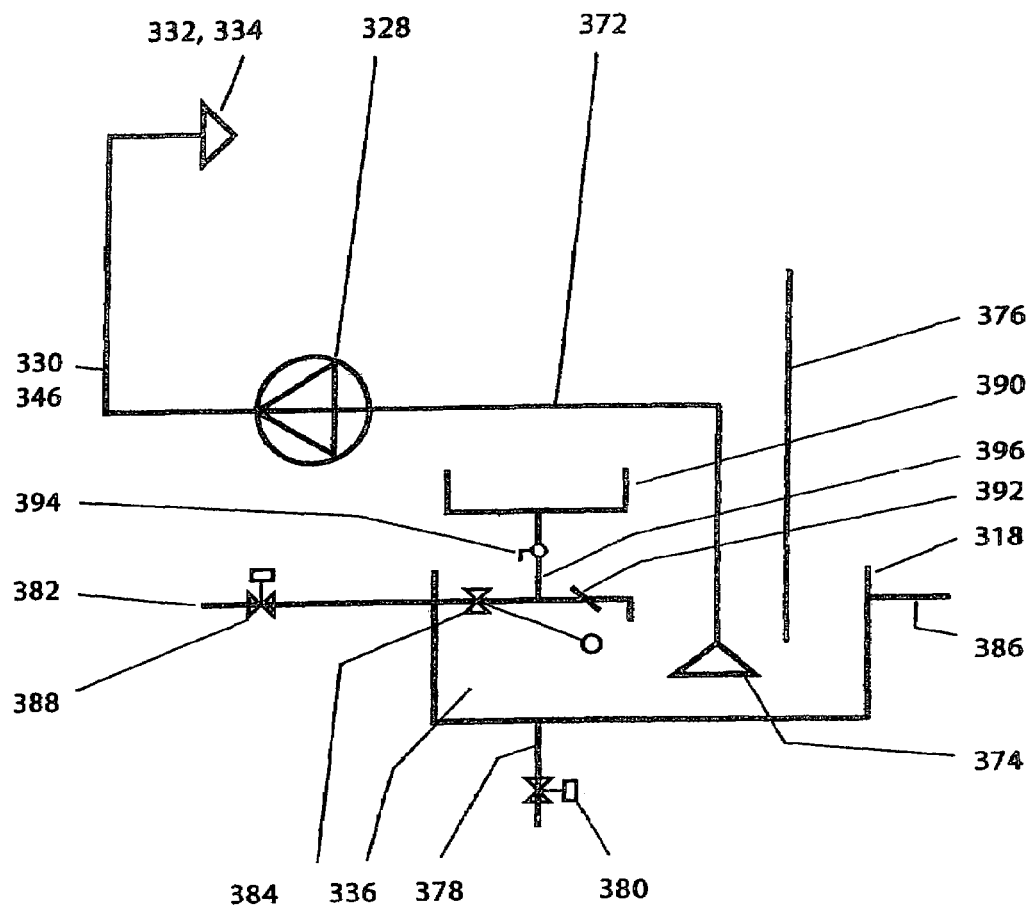

To now refer to FIG. 3, there is shown a preferred form of tank system. Here like components have like reference numerals with the addition of a prefix number "3".

The tank 318 is for holding the cleaning solution 336. The cleaning solution is supplied to nozzles 332, 334 (not shown) by the pump 328 through pipe 330 and pipe 346 (shown as one pipe). A supply pipe 372 with a filter 374 at its end inside tank 318 supplies the cleaning solution to the pump 328. The pump 328 preferably has an interlock so that when the exhaust fan is operating, the pump 328 will be operating.

The pump 328 may also have a manual or cleaning mode so it can be operated independently of the exhaust fan to assist in the cleaning of the exhaust hood, flue, and so forth. This would normally be after cooking has been completed so there is no risk of contamination.

A return pipe or hose 376 is provided to return the cleaning solution to tank 318. An outlet pipe 378 is operatively connected to tank 318 and has a valve 380. Valve 380 may be motorized, or manual. Valve 380 is operated from time-to-time to drain the tank 318 to allow the replacement of the cleaning solution 336. This may be, for example, daily, every 10 hours of operation, or as required. If the valve 380 is motorized, it may have a controller and/or timer to operate when required on an operator-determined cycle.

An inlet pipe 382 is provided and which is connected to a water supply to enable water to be added to the tank 318 when required. A ball valve 384 in pipe 382 is used to control the amount of water added to tank 318. An overflow warning device 386 may also be provided. This may be operatively connected to valve 384, if desired.

A master on/off valve 388 may also be provided in pipe 382 before ball valve 384. Again, valve 388 may be manual, or motorized. If motorized, valve 388 may be linked to valve 380 so that if valve 380 is closed, valve 388 is open; and if valve 380 is open, valve 388 is closed. Only one of valves 380, 388 may be open at the one time.

The degreaser, or other chemical used depending on the nature of the contaminant, is stored in a chemical tank 390 that is connected to pipe 382 between ball valve 384 and a non-return valve 392 by a chemical pipe 396. The non-return valve 392 is to prevent cleaning solution 336 flowing up pipe 382. Chemical tank 390 may have a ball valve 394 so that a bulk supply (not shown) can be used to top-up the degreaser in chemical tank 390.

Preferably, the chemical pipe 396 is connected to pipe 382 such that the water flow in pipe 382 acts like a venturi pump to draw in the degreaser at a required rate. By having chemical pipe 396 after ball valve 384 and before non-return valve 392, any degreaser entering pipe 382 does so into a flow of water and is therefore instantly diluted. Non-return valve 392 may be pressure activated so that when ball valve 384 closes, there will be no pressure on non-return valve 392, so it will also close. This will leave residual water in pipe 382 between valves 384 and 386 to dilute any degreaser. This prevents excessive corrosion of the seat of valves 384 and/or 386.

Figure 4:
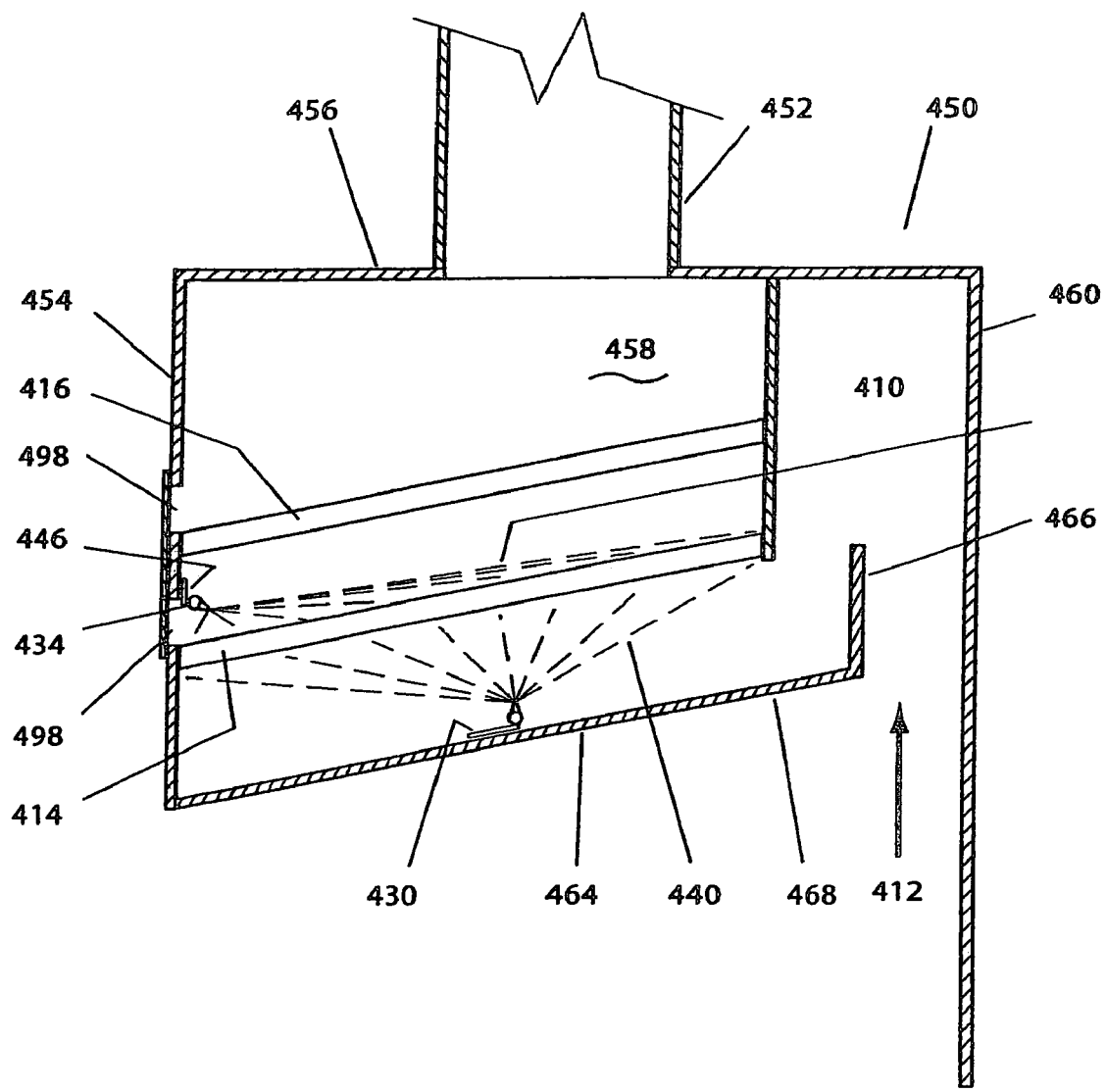

FIG. 4 shows a variation of the exhaust hood of FIG. 2—the exhaust hood of FIG. 4 generally being a mirror or image of that of FIG. 2. Like components have like reference numerals with a prefix number "4". The only difference is that plate 464 extends from front wall 454 as do filters 414 and 416. In this way openings 498 may be provided in front wall 454 to enable filters 414 and 416 to be easily removed for cleaning. Drainage, and cleaning solution supply, would by through the side walls.

Figure 5:
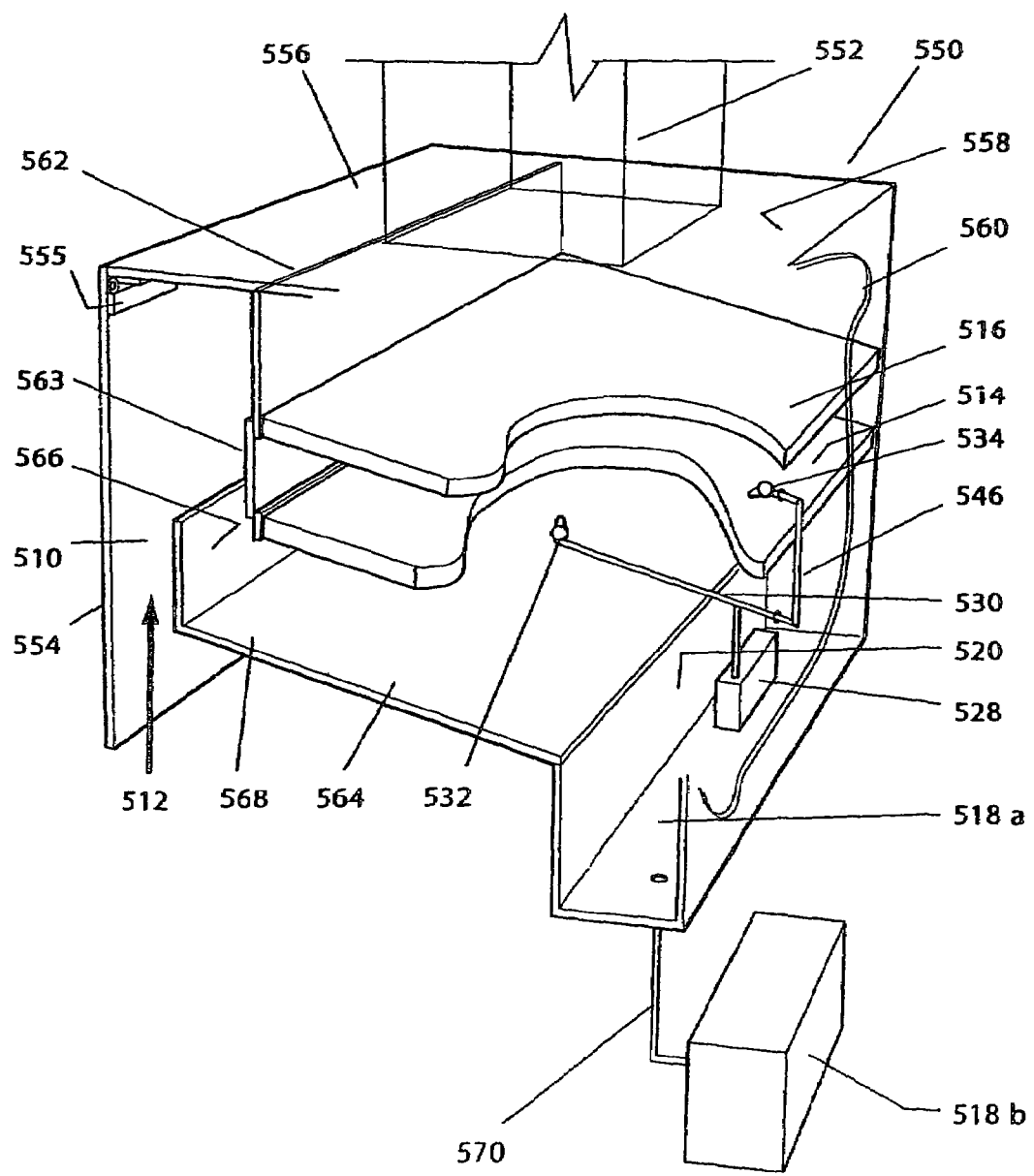

FIG. 5 shows the exhaust hood of FIG. 2 where like components have like reference numerals with a prefix number "5". The only difference is that hinge 555 between front wall 554 and top 556 is shown.

In a further variation (not shown) either or both of the first and second nozzles may be located inside the first and second filters respectively. The plumbing connections may be by the filters having a pipe built-in, with snap fit connections to a supply pipe. In this way gravity can be used to draw the spray through the filters.

Nozzles 32, 34, 232, 234, 432 and 434 may be moving nozzles powered by the cleaning solution pressure and/or by a motor drive.

Whilst there has been described in the foregoing description preferred embodiments of the present invention, it will be understood by those skilled in the technologies concerned that variations in details of design or construction may be made without departing from the present invention.

The present invention extends to all features disclosed either individually, or in all possible combinations and permutations.

The invention claimed is:

1. A self-cleaning kitchen exhaust system, comprising: a first filter in a path for an air flow, the first filter having a first mesh size to capture contaminants; a first spray outlet for providing a first fine spray into the air flow and directed to a front surface of the first filter to enable the first fine spray to be drawn along the path onto the front surface of the first filter; a second spray outlet for providing a second coarse spray into said air flow oath and directed to a rear surface of said first filter for providing a second cleaning spray onto the rear surface of said first filter; and a second filter in the path for the air flow downstream from the first filter, the second filter having a second filter mesh size for capturing contaminants; wherein the first spray has droplets sized to combine with droplets of a contaminant to form combined droplets in the air flow before the first filter to assist the combined droplets being captured by the first filter; and a plate mounted below the first filter for collection of the first spray such that the self-cleaning kitchen exhaust system is operative when cooking is taking place below the plate.

2. A self-cleaning kitchen exhaust system as claimed in claim 1, wherein the first filter and the second filter are in an exhaust hood.

3. A self-cleaning kitchen exhaust system as claimed in claim 2, wherein:
the exhaust hood includes a top, a front wall, a rear wall and side walls extending between the rear wall and the front wall; and
a baffle depending from the top and intermediate the front wall and the rear wall for disrupting the air flow.

4. A self cleaning kitchen exhaust system as claimed in claim 3, wherein both the first and second filters are mountable to one of the front wall and the rear wall, and the baffle extends between the front wall and the rear wall.

5. A self-cleaning kitchen exhaust system as claimed in claim 3, wherein the plate extends forwardly from one of the front wall and the rear wall beyond the baffle.

6. A self-cleaning kitchen exhaust system as claimed in claim 5, wherein the plate has an upwardly directed projection extending between the baffle and the one of the front wall and the rear wall.

7. A self-cleaning kitchen exhaust system as claimed in claim 6, wherein the projection extends upwardly to a height at least as high as the mounting of the first filter to the baffle.

8. A self-cleaning kitchen exhaust system as claimed in claim 5, wherein the spray outlet is mounted on the plate.

9. A self-cleaning kitchen exhaust system as claimed in claim 1, wherein the first filter is inclined with respect to the path for the air flow, and substantially covers the path for the air flow.

10. A self-cleaning kitchen exhaust system as claimed in claim 9, wherein the first filter is at an angle of inclination to the path substantially the same as that of the second filter.

11. A self-cleaning kitchen exhaust system as claimed in claim 1, wherein the cleaning liquid comprises a cleaning solution that includes water and a degreaser in a ratio in the range 1:10 to 1:50.

12. A self-cleaning kitchen exhaust system as claimed in claim 1, wherein the plate forms a boundary for the air flow.

13. A self-cleaning kitchen exhaust system as claimed in claim 1, wherein the plate mounted below the first filter collects combined droplets.

14. A self-cleaning kitchen exhaust system as claimed in claim 1, wherein the first spray is selected from a group consisting of water, and a mixture of water and a cleaning solution.

15. A self-cleaning kitchen exhaust system including a first filter having a first mesh size for filtering contaminants from an air flow along an air flow path, a first spray outlet for providing a fine, first spray of a cleaning solution into the air flow and directed to a front surface of the first filter to enable the fine, first spray to be drawn into the first filter by the air flow, wherein the fine, first spray has droplets sized to combine with droplets of the contaminant to form combined droplets in the air flow before the first filter to assist the combined droplets being captured by the first filter, a second spray outlet for providing a coarse second spray of cleaning solution into the air flow and directed to a rear surface of the first filter, and a plate mounted below the first filter for collection of the fine, first spray such that the exhaust system is operable when cooking is taking place below the first plate.

16. A self-cleaning kitchen exhaust system as claimed in claim 15, wherein the plate is mounted below the first filter and includes an upwardly directed projection at an end of the plate.

17. A self-cleaning kitchen exhaust system as claimed in claim 15, wherein the plate forms a boundary for the air flow.

18. A self-cleaning kitchen exhaust system as claimed in claim 15, wherein the plate mounted below the first filter collects combined droplets.

19. A method of removing at least one contaminant in a kitchen exhaust system, comprising:
   providing a first fine spray into an air flow and directed to a front surface of a first filter, the first filter being mounted in a path of the air flow to enable the first spray to be drawn along the path onto the first filter having a first mesh size; the first spray being able to combine with droplets of the contaminant in the air flow before the first filter; the first spray being able to coat the first filter to assist the first filter in capturing at least one droplet of the contaminant in the air;
   providing a second coarse spray of cleaning solution into the air flow and directed to a rear surface of the first filter, and a plate mounted below the first filter for collection of the first spray such that the self-cleaning kitchen exhaust system is operable when cooking is taking place below the first plate.

20. A method as claimed in claim 19, wherein the air flow causes at least a part of the first spray to pass through the first filter.

21. A method as claimed in claim 19, wherein the second spray also cleans a second filter in said airflow path downstream from said first filter, the second filter having a second mesh size.

22. A method as claimed in claim 21, wherein the second spray substantially coats the second filter to assist the second filter in capturing at least one contaminant.

23. A method as claimed in claim 19, wherein the second spray is drawn under the influence of the airflow to a second filter in said airflow path after said first filter, the second filter having a second mesh size.

24. A method as claim 19, wherein the first filter is has a relatively coarse first mesh size, the second filter is a relatively fine second mesh size.

25. A method as claimed in claim 19, wherein the plate forms a boundary for the air flow.

26. A method as claimed in claim 19, wherein the plate mounted below the first filter collects combined droplets.

27. A self-cleaning kitchen exhaust system, comprising: a first filter in a path for an air flow, the first filter having a first mesh size; a first spray outlet for providing a first fine spray into the air flow and directed to a front surface of the first filter to enable the first spray to be drawn toward the first filter; a second spray outlet located in said air flow and directed to a rear surface of said first filter for providing a second coarse cleaning spray onto the rear surface of said first filter; and a second filter in the path for the air flow downstream from the first filter, the second filter having a second mesh size; wherein the first spray has droplets sized to combine with a contaminant to form combined droplets in the air flow before the first filter, such that the combined droplets are captured by the first filter; a plate mounted below the first filter for collection of the first spray such that the self-cleaning kitchen exhaust system is operative when cooking is taking place below the plate; and a drain for draining fluid collected on the plate.

28. A self-cleaning kitchen exhaust system as claimed in claim 27, wherein the first filter is inclined with respect to the path of the air flow.

29. A self-cleaning kitchen exhaust system as claimed in claim 27, wherein the first spray is selected from a group consisting of water, and a mixture of water and a cleaning solution.

30. A self-cleaning kitchen exhaust system as claimed in claim 27, wherein the plate forms a boundary for the air flow.

31. A method of removing at least one contaminant in a kitchen exhaust system, comprising:
   providing a first fine spray into an air flow and directed to a front surface of a first filter, the first filter having a first mesh size mounting the first filter along a path of the air flow such that the first spray is drawn along the path of the air flow toward the first filter while combining with a contaminant to form combined droplets in the air flow before the first filter;
   providing a second coarse spray into said air flow path and directed to a rear surface of said first filter;
   mounting a plate below the first filter for collection of the first spray such that the self-cleaning kitchen exhaust system is operable when cooking is taking place below the first plate; and draining fluid collected on the plate.

32. A self-cleaning kitchen exhaust system, comprising: a first filter in a path for an air flow and inclined with respect to the path for the air flow, the first filter having a first mesh size; a first spray outlet for providing a first fine spray into the air flow and directed to a front surface of the first filter to enable the first spray to be drawn toward the first filter; a second spray outlet for providing a second coarse spray into said air flow path and directed to a rear surface of said first filter for providing a second cleaning spray onto the rear surface of said first filter; and a second filter in the path for the air flow downstream from the first filter, the second filter having a second mesh size; wherein the first spray has droplets sized to combine with a contaminant to form combined droplets in the air flow before the first filter, such that the combined droplets are captured by the first filter; and a plate mounted below the first filter for collection of the first spray such that the self-cleaning kitchen exhaust system is operative when cooking is taking place below the plate.

33. A self-cleaning kitchen exhaust system as claimed in claim 32, wherein the first spray is selected from a group consisting of water, and a mixture of water and a cleaning solution.

* * * * *

UNITED STATES PATENT AND TRADEMARK OFFICE
CERTIFICATE OF CORRECTION

PATENT NO.         : 7,614,396 B2
APPLICATION NO.    : 10/524309
DATED              : November 10, 2009
INVENTOR(S)        : Kim Lui So It is certified that error appears in the above-identified patent and that said Letters Patent is hereby corrected as shown below:

Column 8, claim 1:
Line 3, please replace the word "oath" with --path--.

Column 9, claim 24:
Line 49, please delete the word "is".

Signed and Sealed this

Fifth Day of January, 2010

David J. Kappos
*Director of the United States Patent and Trademark Office*